United States Patent
Song et al.

(10) Patent No.: US 12,225,441 B2
(45) Date of Patent: Feb. 11, 2025

(54) SERVER, METHOD AND DEVICE FOR V2X SERVICE

(71) Applicant: LG ELECTRONICS INC., Seoul (KR)

(72) Inventors: Min Song, Seoul (KR); Jiyoon Oh, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 360 days.

(21) Appl. No.: 17/911,060

(22) PCT Filed: Jul. 1, 2020

(86) PCT No.: PCT/KR2020/008556
§ 371 (c)(1),
(2) Date: Sep. 12, 2022

(87) PCT Pub. No.: WO2022/004912
PCT Pub. Date: Jan. 6, 2022

(65) Prior Publication Data
US 2023/0107147 A1   Apr. 6, 2023

(51) Int. Cl.
*H04W 4/40* (2018.01)
*H04W 4/021* (2018.01)
*H04W 88/18* (2009.01)

(52) U.S. Cl.
CPC ............. *H04W 4/40* (2018.02); *H04W 4/021* (2013.01); *H04W 88/18* (2013.01)

(58) Field of Classification Search
CPC ........ H04W 4/40; H04W 4/021; H04W 88/18
See application file for complete search history.

(56) References Cited

U.S. PATENT DOCUMENTS

| | | | |
|---|---|---|---|
| 10,499,370 B2 | 12/2019 | Xu et al. | |
| 11,218,554 B2* | 1/2022 | Lee .......................... | H04W 4/50 |
| 11,477,681 B2* | 10/2022 | Kim ....................... | H04W 24/10 |
| 11,909,536 B2* | 2/2024 | Zhao ...................... | H04W 72/02 |
| 11,917,562 B2* | 2/2024 | Liu ......................... | H04L 5/0053 |
| 2017/0116861 A1 | 4/2017 | Ichihara et al. | |
| 2018/0302752 A1 | 10/2018 | Ueno et al. | |
| 2019/0239118 A1 | 8/2019 | Baghel et al. | |
| 2019/0355258 A1 | 11/2019 | Kimura | |

FOREIGN PATENT DOCUMENTS

| | | |
|---|---|---|
| CN | 107040959 A1 | 8/2017 |
| CN | 107925853 A | 4/2018 |
| CN | 107925906 A1 | 4/2018 |
| CN | 108140307 A1 | 6/2018 |
| CN | 109249928 A | 1/2019 |
| CN | 110235189 A1 | 9/2019 |
| CN | 110419070 A1 | 11/2019 |
| CN | 110663071 A1 | 1/2020 |

(Continued)

*Primary Examiner* — Chandrahas B Patel
(74) *Attorney, Agent, or Firm* — Birch, Stewart, Kolasch & Birch, LLP

(57) ABSTRACT

A server for a vehicle-to-everything (V2X) service sets a device area comprising a plurality of V2X devices, and classifies the plurality of V2X devices within the device area into a plurality of device groups. The plurality of device groups have mutually different transmission periods.

13 Claims, 15 Drawing Sheets

(56) References Cited

FOREIGN PATENT DOCUMENTS

| | | |
|---|---|---|
| CN | 111263329 A | 6/2020 |
| KR | 10-2018-0012658 A | 2/2018 |
| KR | 10-2018-0044992 A | 5/2018 |
| KR | 10-2019-0120105 A | 10/2019 |
| WO | 2017/030348 A1 | 2/2017 |
| WO | 2017/046979 A1 | 3/2017 |
| WO | 2017/052690 A1 | 3/2017 |
| WO | 2017/133501 A1 | 8/2017 |
| WO | 2020/051807 A1 | 3/2020 |
| WO | WO2020/060289 A1 | 3/2020 |

* cited by examiner

: First Subscription Area

: Second Subscription Area

SERVER, METHOD AND DEVICE FOR V2X SERVICE

CROSS REFERENCE TO RELATED APPLICATIONS

This application is the National Stage filing under 35 U.S.C. 371 of International Application No. PCT/KR2020/008556, filed on Jul. 1, 2020, which is hereby expressly incorporated by reference into the present application.

BACKGROUND OF THE DISCLOSURE

Field

The present disclosure relates to a server for vehicle-to-everything (V2X) service, and a method and a device using the same.

Related Art

A vehicle is an apparatus which moves a passenger from one place to another place. A representative example is a car. A vehicle-to-everything (V2X) communication technology, which means vehicle-to-object communication, refers to a technology in which the vehicle communicates with other vehicles, pedestrians, road infrastructures, servers, and the like to provide a series of services.

For the V2X, standardization organizations such as Institute of Electrical and Electronics Engineers (IEEE), 3rd Generation Partnership Project (3GPP), etc. provide various communication specifications. Dedicated Short Range Communications (DSRC) is the communication standard protocol based on IEEE 802.11p. Cellular-V2X (C-V2X) is the communication standard protocol based on cellular communication protocol of 3GPP. In general, V2X has focused on vehicle safety through direct communication between vehicles, but recently V2X includes vehicle-to-infrastructure communication for communicating with peripheral devices via a network.

Attempts are being made to extend V2X technology to be applied to pedestrians and other electronic devices, rather than simply being used for vehicle safety, such as vehicle-to-vehicle and vehicle-to-peripheral devices.

SUMMARY OF THE DISCLOSURE

The present disclosure relates to a server for vehicle-to-everything (V2X) service, and a method and a device using the same.

In an aspect, a server for vehicle-to-everything (V2X) service includes a processor, and a memory operatively coupled with the processor and configured to store instructions that, when executed by the processor, cause the server to perform functions. The functions include configuring a device area comprising a plurality of V2X devices, each V2X device periodically transmitting a V2X message to the server according a transmission period, the V2X message comprising a V2X ID identifying a corresponding V2X device and driving information of the corresponding V2X device, and classifying the plurality of V2X devices within the device area into a plurality of device groups. The plurality of device groups have different transmission periods.

In another aspect, a method for vehicle-to-everything (V2X) service is provided. The method performed by a server and includes configuring a device area comprising a plurality of V2X devices, each V2X device periodically transmitting a V2X message to the server according a transmission period, the V2X message comprising a V2X ID identifying a corresponding V2X device and driving information of the corresponding V2X device, and classifying the plurality of V2X devices within the device area into a plurality of device groups. The plurality of device groups have different transmission periods.

In still another aspect, a device for vehicle-to-everything (V2X) service includes a processor, and a memory operatively coupled with the processor and configured to store instructions that, when executed by the processor, cause the server to perform functions. The functions include transmitting periodically a V2X message to a V2X server according a transmission period, the V2X message comprising a V2X ID identifying the device and driving information of the device, receiving a control message for modifying the transmission period from the V2X server device, and determining whether the transmission period is modified based on the control message.

It is possible to provide V2X services to more diverse users as well as vehicles.

DETAILED DESCRIPTION OF THE EMBODIMENTS

Figure 1:
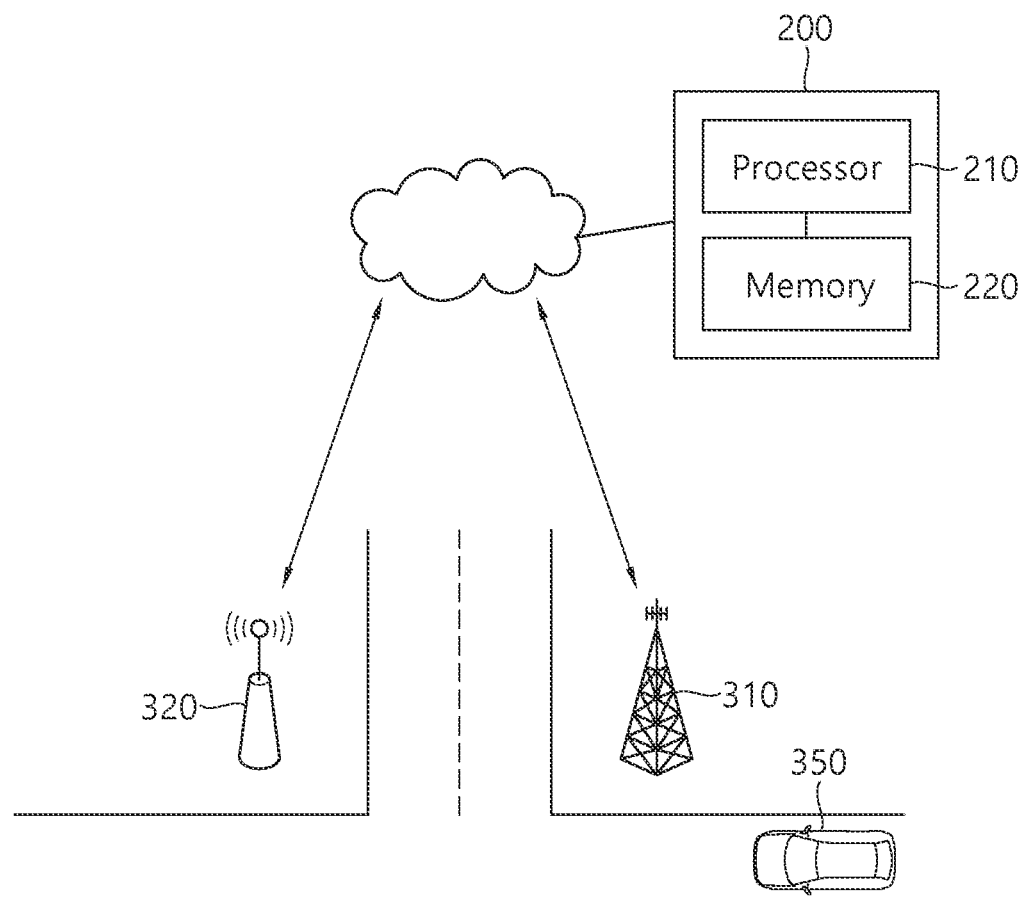
FIG. 1 shows a system to which an embodiment of the present specification is applied.
Figure 1:
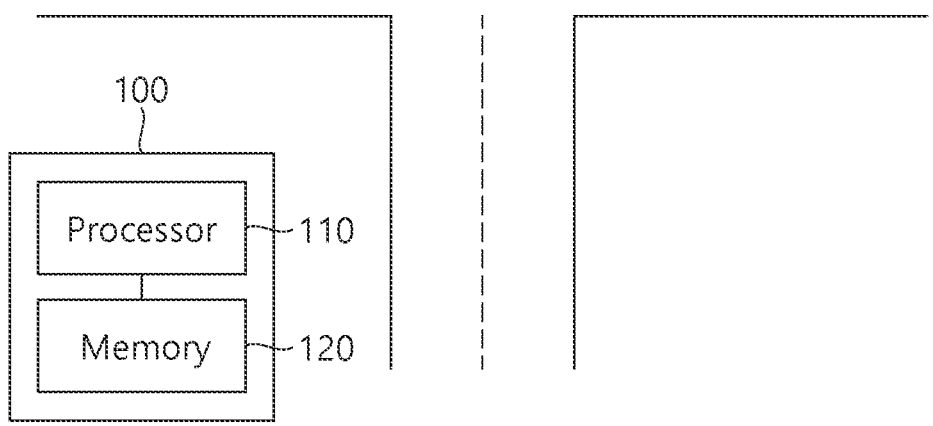

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical ideas disclosed in the present specification are not limited by the accompanying drawings.

Terms including an ordinal number, such as first, second, etc., may be used to describe various elements, but the elements are not limited by the terms. The above terms are used only for the purpose of distinguishing one component from another.

When an element is referred to as being "connected" or "coupled" to another element, it is understood that it may be directly connected or coupled to the other element, but other elements may exist in between. On the other hand, when it is mentioned that a certain element is "directly connected" or "directly coupled" to another element, it should be understood that no other element is present in the middle.

The singular expression includes the plural expression unless the context clearly dictates otherwise.

In the present application, terms such as "comprises" or "have" are intended to designate that the features, numbers, steps, operations, components, parts, or combinations thereof described in the specification exist, but it is to be understood that this does not preclude the possibility of addition or existence of one or more other features, numbers, steps, operations, components, parts, or combinations thereof.

A vehicle according to an embodiment of the present specification can be defined as a means of transport traveling on a road or track. Vehicles may include automobiles, ships, aircraft, trains, motorcycles, bicycles, and the like. The vehicle may include an internal combustion engine vehicle having an engine as a power source, a hybrid vehicle having an engine and an electric motor as a power source, an electric vehicle having an electric motor as a power source, and combinations thereof.

A vehicle-to-everything (V2X) device according to an embodiment of the present specification refers to a device that provides V2X functions and V2X services to users based on software, and is also referred to as a SoftV2X device. The V2X device may be implemented based on hardware and/or software in an electronic device operated by a user such as User Equipment (UE), mobile station (MS), mobile terminal (MT), user terminal (UT), cellular phone, laptop, handheld device, tablet, drone, consumer electronics, and the like. The V2X device may be mounted on a vehicle or electronic device as an on-board unit (OBU) to provide V2X functions and services to the vehicle. A V2X device disposed inside or outside the vehicle may be connected to the vehicle through a wireless interface to provide V2X functions and V2X services to the vehicle.

FIG. 1 shows a system to which an embodiment of the present specification is applied.

A system includes a V2X device 100 and a V2X server 200. The V2X device 100 may communicate with the V2X server 200 through the base station 310 or a Road Side Unit (RSU) 320. The V2X device 100 may communicate with the base station 310, the RSU 320, a neighbor vehicle 350 and/or a neighbor V2X device using a wireless communication protocol. There is no limitation on the wireless communication protocol. The wireless communication protocol may include Dedicated Short Range Communications (DSRC), Cellular-V2X (C-V2X), WiFi, BLUETOOTH and/or cellular communication protocols based on 3rd Generation Partnership Project (3GPP) (e.g. Wideband Code Division Multiple Access (WCDMA), Long Term Evolution (LTE), New Radio (NR), etc.).

The V2X server 200 receives one or more V2X messages from the V2X device 100 within a managed area. The V2X server 200 may forward the one or more collected V2X messages to the subscribing V2X device 100.

The V2X message may periodically or aperiodically be transmitted to the V2X server 200 by the V2X device 100 (or RSU 320), and is a message providing status information of the V2X device 100 (or device managed by the RSU 320). For example, the V2X device 100 may transmit 10 V2X messages per second. The V2X server 200 collects V2X messages from multiple V2X devices, and forwards the V2X messages to subscribing V2X devices.

The following table shows examples of information elements included in the V2X message. Not all information elements are required, and names are examples only. Information elements may be added/changed/deleted according to policies or circumstances.

TABLE 1

| Name | Description |
| --- | --- |
| V2X ID | A temporary identifier (ID) for identifying the V2X device sending this message. It is randomly selected by the V2X device and can be changed periodically. The size can be 4 octets. |
| Position | Indicates the location of the V2X device. Can contain latitude, longitude and elevation. |
| Position Accuracy | Including the quality of various parameters used to model the accuracy of positioning. |
| Velocity | Indicates the velocity of the V2X device. |
| Heading | Indicates the current heading (direction of motion) of the V2X device. |
| Path History | defines a geometric path reflecting V2X device's movement over some period of time and/or distance |
| Acceleration | Indicates the acceleration of the V2X device. Can include a set of acceleration values for three orthogonal directions of the V2X device: a longitudinal axis, a lateral axis, and a vertical axis. |
| Device Type | Indicates the type of V2X device. Example: pedestrian, automobile, bicycle, etc. |
| Publishing Area | To be described later |

The V2X message transmitted by the V2X device 100 to the V2X server 200 is called an uplink (UL) V2X message, and the V2X message transmitted by the V2X server 200 to the V2X device 100 is called a downlink (DL) V2X message.

The V2X device 100 may include a processor 110 and a memory 120. The processor 110 implements the functions of the V2X device 100 and may include one or more software modules. The V2X device 100 may further include various additional devices according to functions such as a display, a user interface, and a wireless modem.

The V2X server 200 is connected to one or more base stations 310 and/or RSU 320 and includes computing hardware that provides V2X functions and V2X services to the V2X device 100. The V2X server 200 may be a Mobile/Mutli-access Edge Computing (MEC)-based server or a centralized-based server. The V2X server 200 may be called another name, such as a Geocast server or a SoftV2X server. The V2X server 200 may include a processor 210 and a memory 220. The processor 210 implements the function of the V2X server 200, and may include one or more software modules.

The processors 110 and 210 may include Application-Specific Integrated Circuits (ASICs), Central Processing Unit (CPU), Application Processor (AP), Digital Signal Processor (DSP), Digital Signal Processing Device (DSPD), Programmable Logic Device (PLD), Field Programmable Gate Array (FPGA), micro-controller, chipset, logic circuits, data processing device and/or combinations thereof. In the software implementation for the following embodiments, the software code for performing the functions described herein may be stored in the memories 120 and 220 and executed by the processors 110 and 210.

Memories 120 and 220 may store information accessible by processors 110 and 210. The information may include instructions executable by the processors 110 and 210 and/or data processed by the processor. Memories 120 and 220 may include any form of computer-readable medium operable to store information. For example, the memories 120 and 220 include read only memory (ROM), random access memory (RAM), digital video disc (DVD), optical disc, flash memory, solid state drive (SSD), hard drive and combinations thereof.

Message Queuing Telemetry Transport (MQTT) is used as a message queuing protocol between the V2X device 100 and the V2X server 200, but this is only an example. Advanced Message Queuing Protocol (AMQP), HyperText Transfer Protocol (HTTP), and/or vendor specific protocols may be used.

Now, setting an area for V2X service will be described in more detail. Hereinafter, a tile refers to a geographic basic unit for setting a subscription area. Hereinafter, a rectangle is shown in the form of a tile, but it is only an example. There are no restrictions on the shape of the tile, such as polygons or circles.

Figure 2:
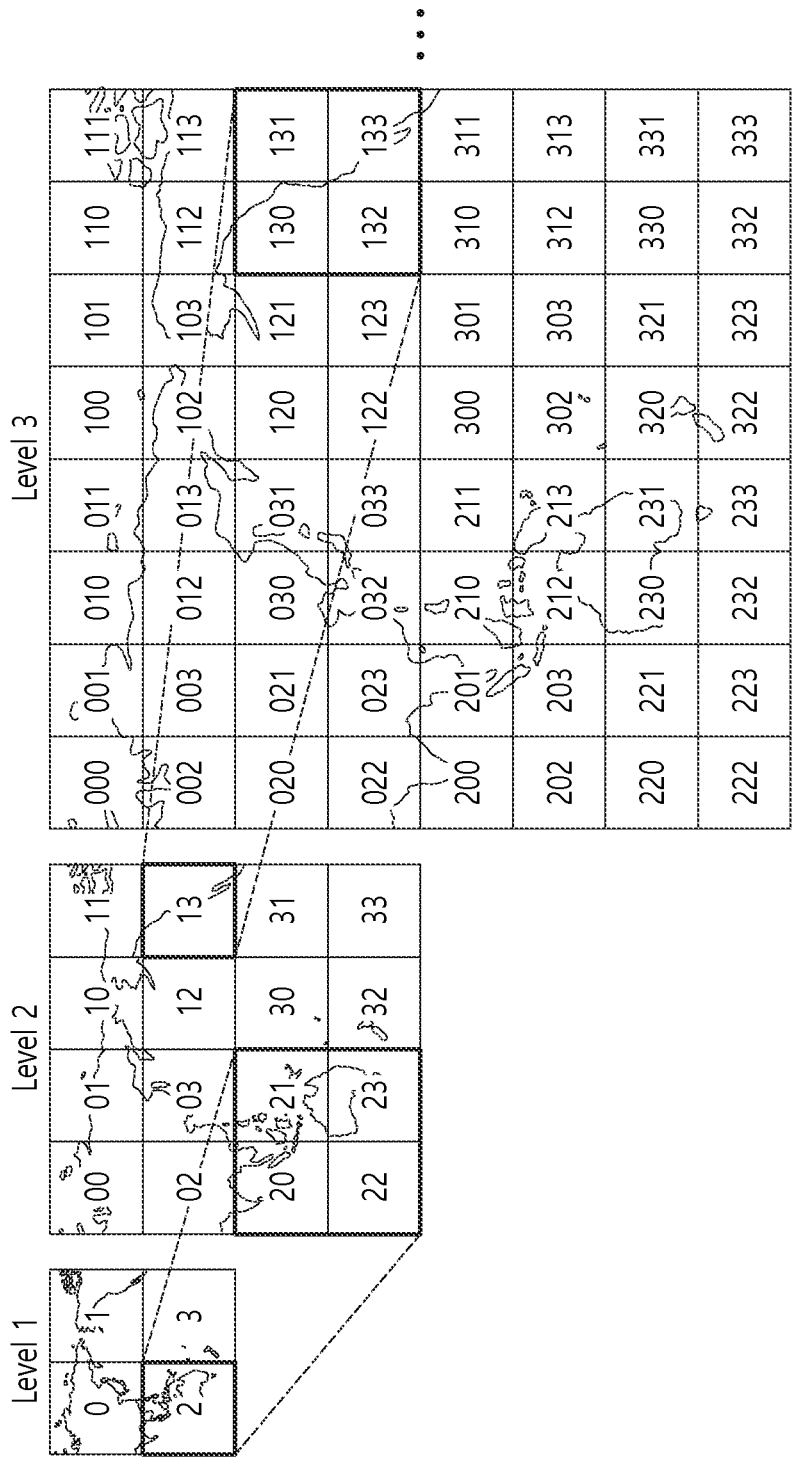
FIG. 2 shows an example of a tile using a quadtree.

FIG. 2 shows an example of a tile using a quadtree.

The quadtree represents a partition of space in two dimensions by decomposing a map (i.e. world map) into four equal quadrants, subquadrants, and so on. The size of a quadrant varies according to a zoom level, and each quadrant corresponds to a tile. Here, the case where the levels are 1, 2, and 3 is shown. The larger the level, the smaller the size of the tile. At each level, a unique ID is assigned to a tile. The tile ID may have the number of bits corresponding to the level.

The V2X device may acquire the ID of the tile in which it is located based on its location information (e.g. latitude and longitude). The V2X device and/or the V2X server may adjust the size of the area by adjusting the level according to the situation.

In the following embodiment, the area for the V2X service is defined as follows.

Management area: The area managed by the V2X server. The management area includes one or more tiles.

Subscription area: The area where the V2X device requests a subscription to the V2X server. The subscription area may be referred to as another name, such as a concerned area, an impact area, or a geocast area. The subscription area contains one or more tiles. The subscription area may be included in one management area, and may be defined across a plurality of management areas managed by a plurality of V2X servers.

Publishing area: The area where the V2X device publishes V2X messages to the V2X server. The publishing area may include one tile in each level. The publishing area may indicate a tile where the V2X device is currently located. Some or all of the publishing area may overlap with the subscription area.

Figure 3:
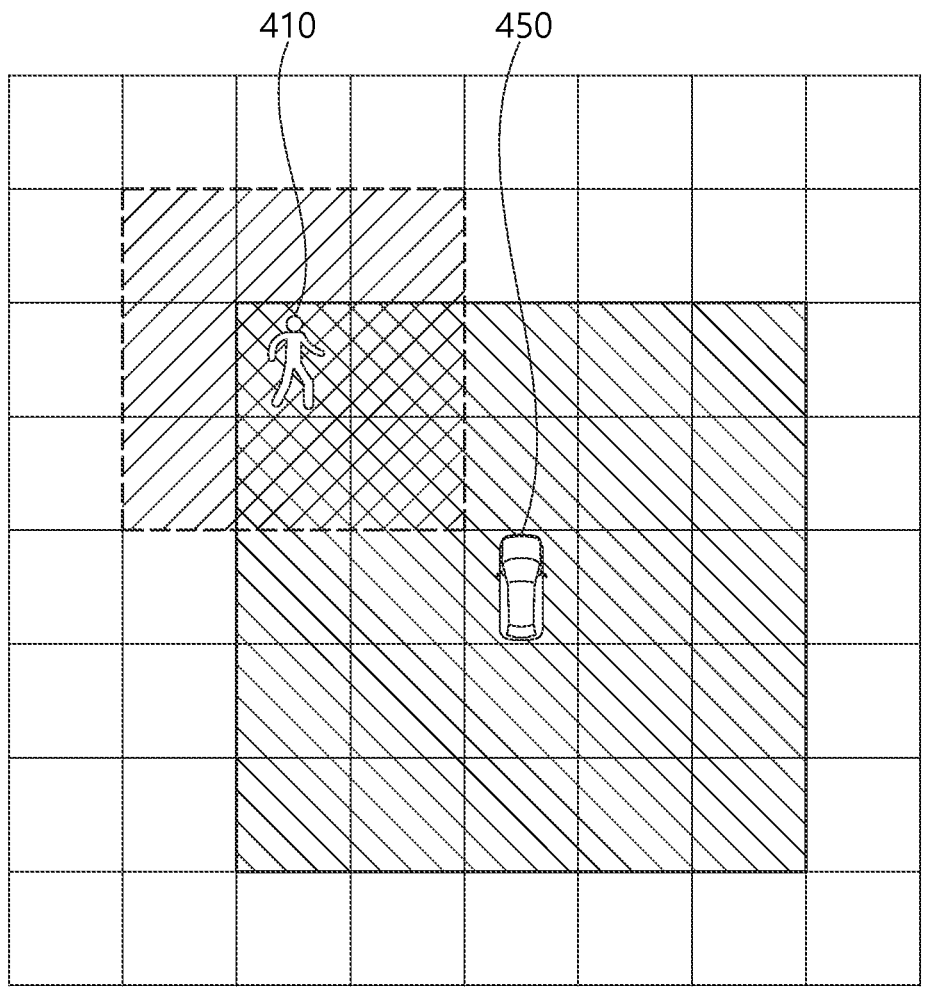
FIG. 3 shows an example in which a subscription area is set.
Figure 3:
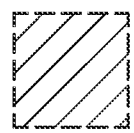
Figure 3:
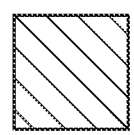

FIG. 3 shows an example in which a subscription area is set.

A first subscription area is set to the first V2X device 410, and a second subscription area is set to the second V2X device 450. Each V2X device can set/change/delete the subscription area periodically or aperiodically (e.g. when its location is changed). Each V2X device can request setting/change/deletion of the subscription area to the V2X server.

The number of tiles included in the first subscription area is 9 and the number of tiles included in the second subscription area is 25, but the number of tiles included in the subscription area or the shape of the subscription area is not limited. The subscription area may include a tile in which the V2X device is located. Alternatively, the subscription area may include one or more tiles other than a tile in which the V2X device is located.

The first V2X device 410 may generate a first V2X message and periodically send the first V2X message to the V2X server. The second V2X device 450 may generate a second V2X message and periodically send the second V2X message to the V2X server.

The V2X server may forward one or more V2X messages received in or around a subscription area to the V2X device related to the subscription area.

A device that sets a subscription area may be referred to as a "subscriber device". A device that transmits a V2X message to a V2X server can be referred to as a "provider device". A V2X device may be a subscriber device, a provider device, or both a subscriber device and a provider device. The V2X server may forward the V2X messages transmitted by the provider devices in the management area to the subscriber device.

The V2X server may deliver the V2X message of a provider device "associated" to the subscription area of a subscriber device to the subscriber device. A provider device associated with a subscription area of a subscriber device may be referred to as a "subscribed provider device". The provider device associated with the subscription area of the subscriber device may satisfy at least one of the following conditions (i) to (iii): (i) Part or all of the publishing area of the provider device overlaps with the subscription area of the subscriber device. (ii) some or all of the subscription area of the provider device overlaps the subscription area of the subscriber device; and/or (iii) The location where the provider device transmits the V2X message is within the subscription area of the subscriber device.

According to condition (i) or (iii), the V2X server delivers V2X messages received in the first subscription area to the first V2X device 410. The V2X server delivers V2X messages received in the second subscription area to the second V2X device 450.

Since the first V2X device 410 is located in the second subscription area, the V2X server may forward the first V2X message to the second V2X device 450. The second V2X device 450 is a subscriber device, and the first V2X device 410 is a subscribed provider device.

Since the second V2X device 450 is not located in the first subscription area (which means that condition (i) or condition (iii) is not satisfied), the V2X server does not forward the second V2X message to the first V2X device 410. The second V2X device 450 is not a provider device of the first V2X device 410. If condition (ii) is considered, the second V2X device 450 may be a provider device of the first V2X device 410.

Figure 4:
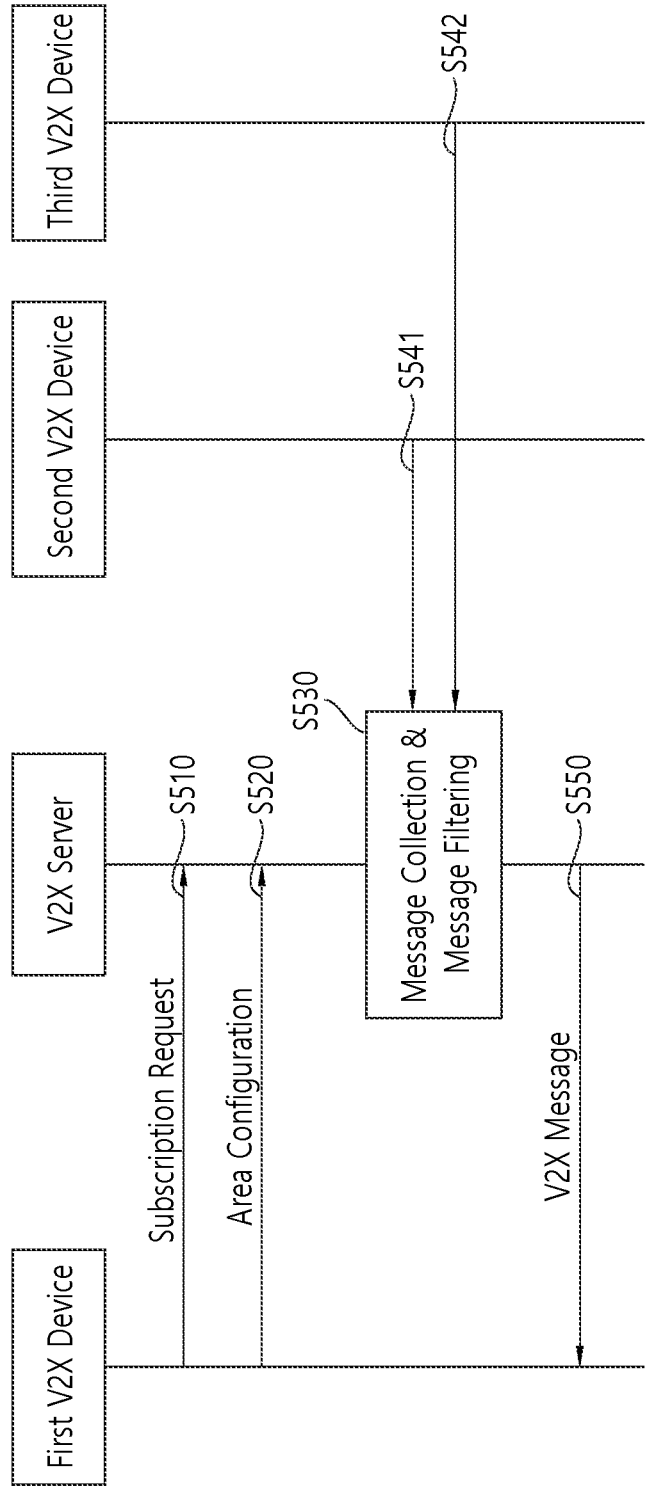
FIG. 4 is a flowchart illustrating a method for a V2X service according to an embodiment of the present specification.

FIG. 4 is a flowchart illustrating a method for a V2X service according to an embodiment of the present specification.

In step S510, a V2X device sends a subscription request for requesting subscription of the V2X service to a V2X server. The subscription request may include information about the identifier, location, etc. of the V2X device. The V2X server may transmit a subscription response for granting or rejecting subscription to the V2X device in response to the subscription request.

In step S520, the V2X device may send the area configuration related to the V2X service to the V2X server. The area configuration may be included in a separate message or included in the subscription request. The area configuration includes information about configuration and/or modification of the subscription area.

In step S530, the V2X server may collect V2X messages from V2X devices in the management area, and perform message filtering.

The V2X server receives the first V2X message from the second V2X device (step S541), and receives the second V2X message from the third V2X device (step S542). Assume that the second V2X device belongs to the subscription area of the first V2X device, but the third V2X device does not belong to the subscription area of the first V2X device.

In step S550, the V2X server publishes the first V2X message belonging to the subscription area of the first V2X device to the first V2X device. The first V2X device is a subscriber device and the second V2X device is a provider device. Since a V2X message of the third V2X device is not delivered to the first V2X device, the third V2X device is not a provider device of the first V2X device.

If there are a plurality of V2X messages to be sent to the first V2X device, the plurality of V2X messages may be published separately or as a single message.

Message filtering is that V2X server filters the V2X messages to be transmitted to V2X devices that have completed the subscription request. Message filtering may be referred to as a process of selecting a subscribed provider device associated with a subscriber device among a plurality of provider devices. Filtering conditions may be defined differently depending on the subscription area and/or the state of the V2X device. For example, if the number of V2X devices in the subscription area is large, the filtering conditions may be modified so that more messages are filtered out. Filtering condition may be related to the degree of risk of the V2X device.

As described above, the V2X device may periodically or aperiodically transmit a V2X message to the V2X server. Hereinafter, a method for controlling the transmission period for the V2X device to periodically transmit the V2X message is described.

An example of a user having a V2X device is a Vulnerable Road User (VRU). The VRU refers to a user located near a road or relatively vulnerable to accidents, and includes a pedestrian, a motorcycle, a bicycle, and the like. Hereinafter, the VRU is exemplarily described as an example of a V2X device, but is not limited thereto.

Figure 5:
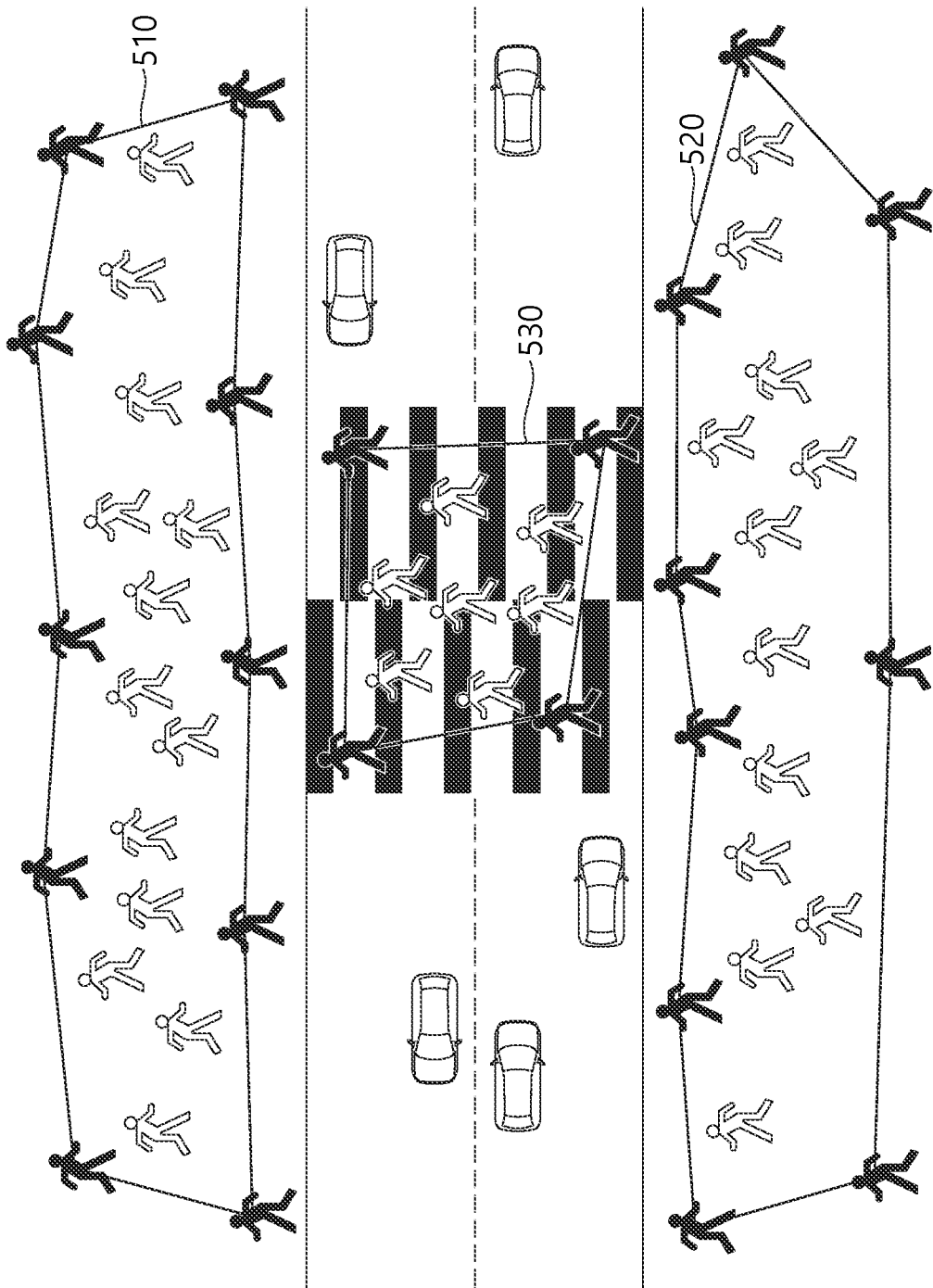
FIG. 5 shows an example in which a device area for controlling a transmission period is configured.

FIG. 5 shows an example in which a device area for controlling a transmission period is configured.

The V2X server may configure a plurality of device areas 510, 520, and 530 within a management area. The device areas 510, 520, and 530 may be configured along one or more VRUs having a relatively high risk. The device areas 510, 520, and 530 may be set according to the distribution of VRUs (i.e., V2X devices) within the area. Here, it is shown that two device areas 510 and 520 on both sides of the road and one device area 530 are configured on a crosswalk, but the number, location, and shape of the device areas are only examples.

The device area includes a plurality of VRUs. The plurality of VRUs may be classified into a plurality of device groups according to a transmission period. The transmission period refers to a period in which the VRU transmits a V2X message to the V2X server (and/or to another V2X device) or a period in which the V2X server transmits a V2X message to the VRU. The first device group may have a first transmission period, and the second device group may have a second transmission period.

Figure 6:
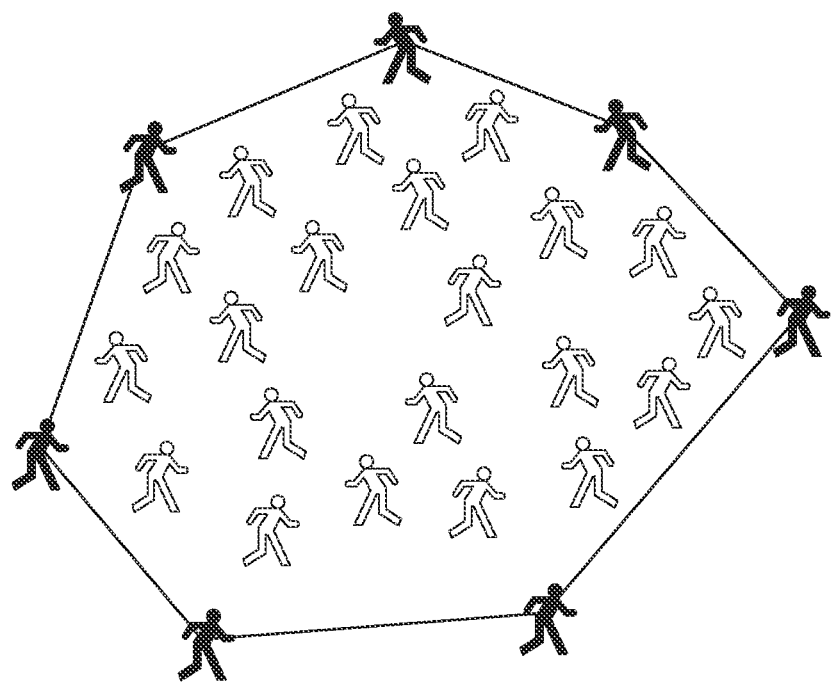
FIG. 6 shows an example in which a device area is configured.

FIG. 6 shows an example in which a device area is configured.

The device area may be set so that a VRU having a relatively high risk is disposed at a border. The V2X server can evaluate the risk by considering surrounding risk factors (vehicles moving at high speed, etc.). The earlier the VRU is temporally exposed to the risk, the higher the risk may be evaluated.

A VRU located at the boundary of the device area and having a relatively high risk is called an exterior VRU, and a VRU positioned inside the device area and having a relatively low risk is called an interior VRU. The exterior VRU may be referred to as a high risk VRU, and the interior VRU may be referred to as a low risk VRU. VRUs in the device area may be classified into a first device group, which has one or more external VRUs, and a second device group, which has one or more internal VRUs. The first device group with high risk may have a shorter transmission period than the second device group with low risk. For example, the first device group may have a transmission period of 1 second, and the second device group may have a transmission period of 5 seconds.

Figure 7:
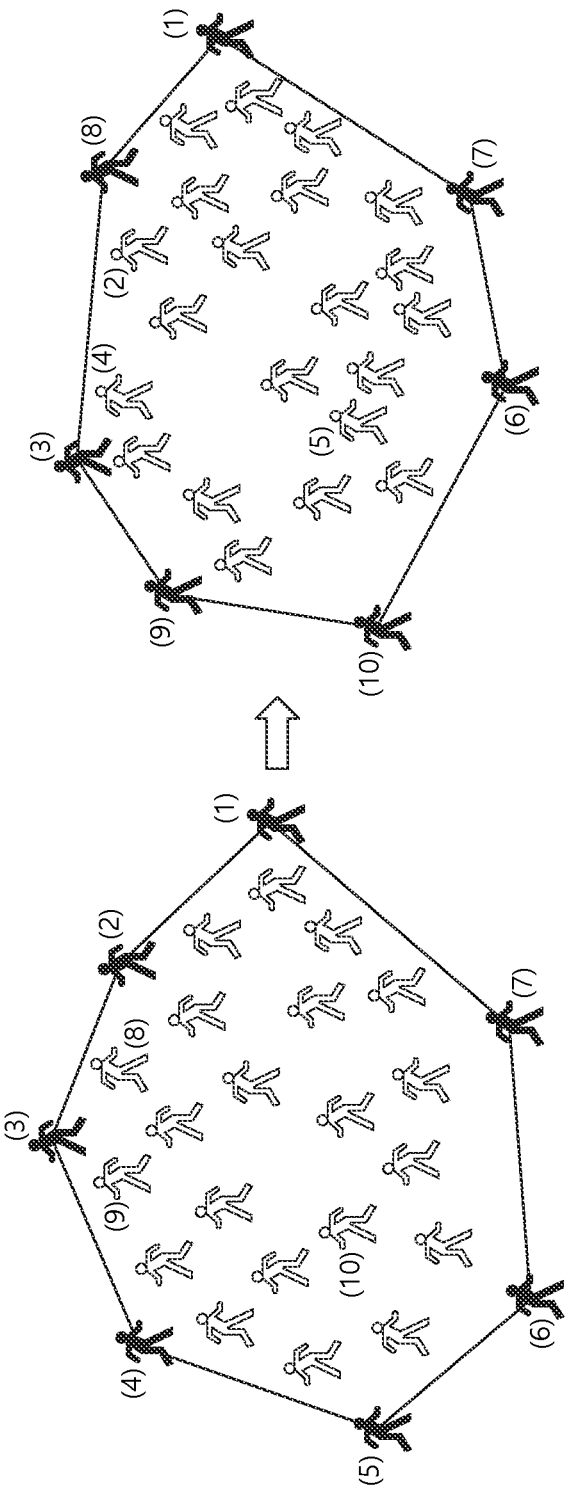
FIG. 7 shows another example in which a device area is configured.

FIG. 7 shows another example in which a device area is configured.

The device area according to the movement of the VRU may vary. The V2X server may periodically or aperiodically update the device area. Device areas may be changed/separated/merged due to separation of a VRU group, exit of a VRU from a device area, entrance of a new VRU, and the like. As the device area changes, an exterior VRU may be changed to an internal VRU, or an interior VRU may be changed to an external VRU.

Here, an example in which the device area is changed after a certain time has elapsed is shown. VRUs (1), (3), (6), (7) remain unchanged. VRUs (2), (4) and (5) are changed from an exterior VRU to an internal VRU. VRUs (8), (9), (10) are changed from an interior VRU to an exterior VRU.

Figure 8:
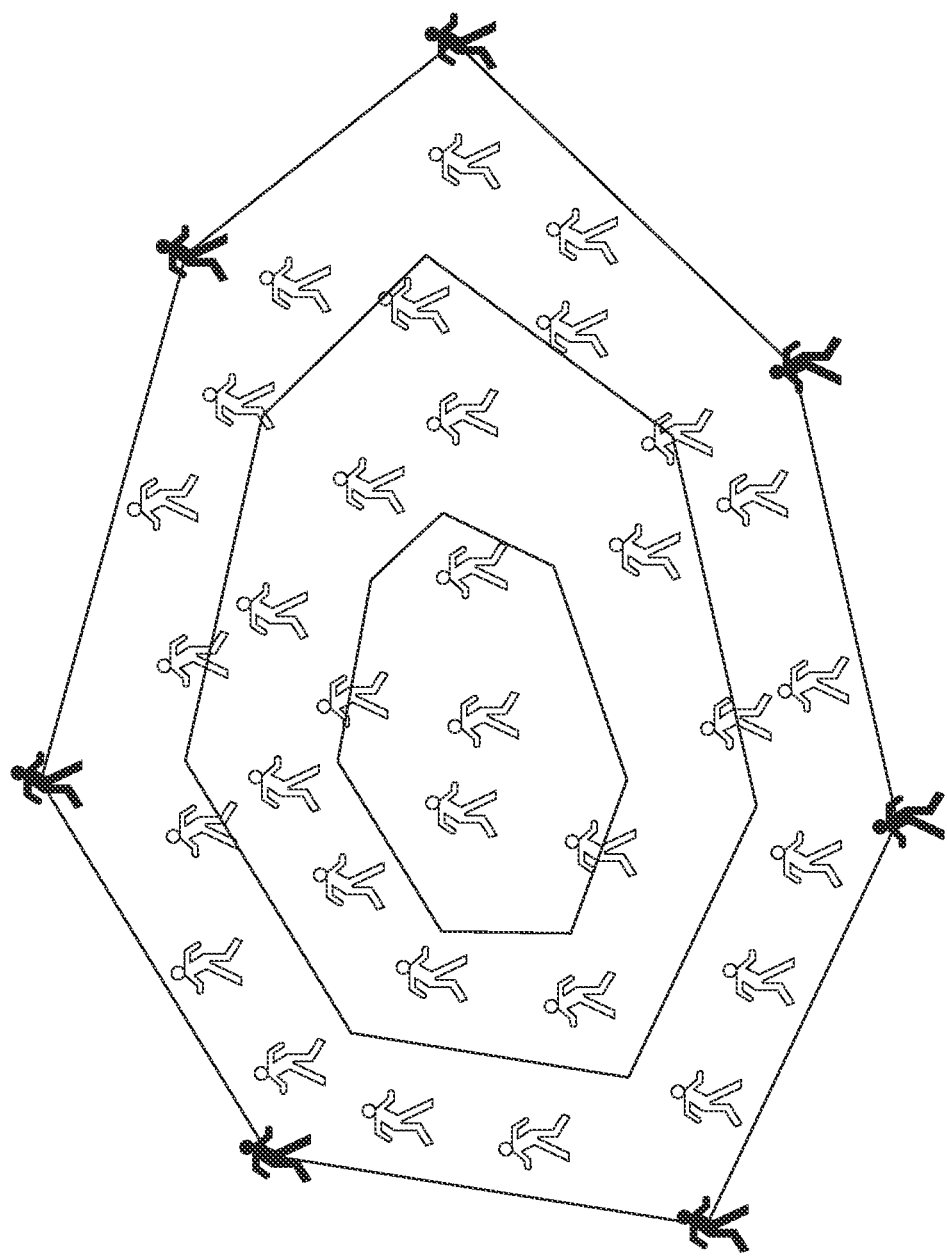
FIG. 8 shows another example in which a device area is configured.

FIG. 8 shows another example in which a device area is configured.

VRUs in the device area are not limited to a two-level group of an exterior VRU group and an interior VRU group, but may be classified into a plurality of VRU groups according to a plurality of levels. The transmission period of the V2X message may vary according to a plurality of levels. Assuming that a lower level of risk has a higher level, the VRU group of the lowest level may have the shortest transmission period.

Here, a 4-level VRU group is exemplarily shown. Located at the outermost part of the device area, there is an exterior VRU group (level 0 VRU group), which has a set of VRUs having the highest risk. Inside the device area, there are three levels of interior VRU groups according to the degree of risk. The set of VRUs closest to the exterior VRU group and having the highest risk is the first interior VRU group (level 1 VRU group), followed by the second interior VRU group (level 2 VRU group), and the third interior VRU group in this order. (level 3 VRU group).

Figure 9:
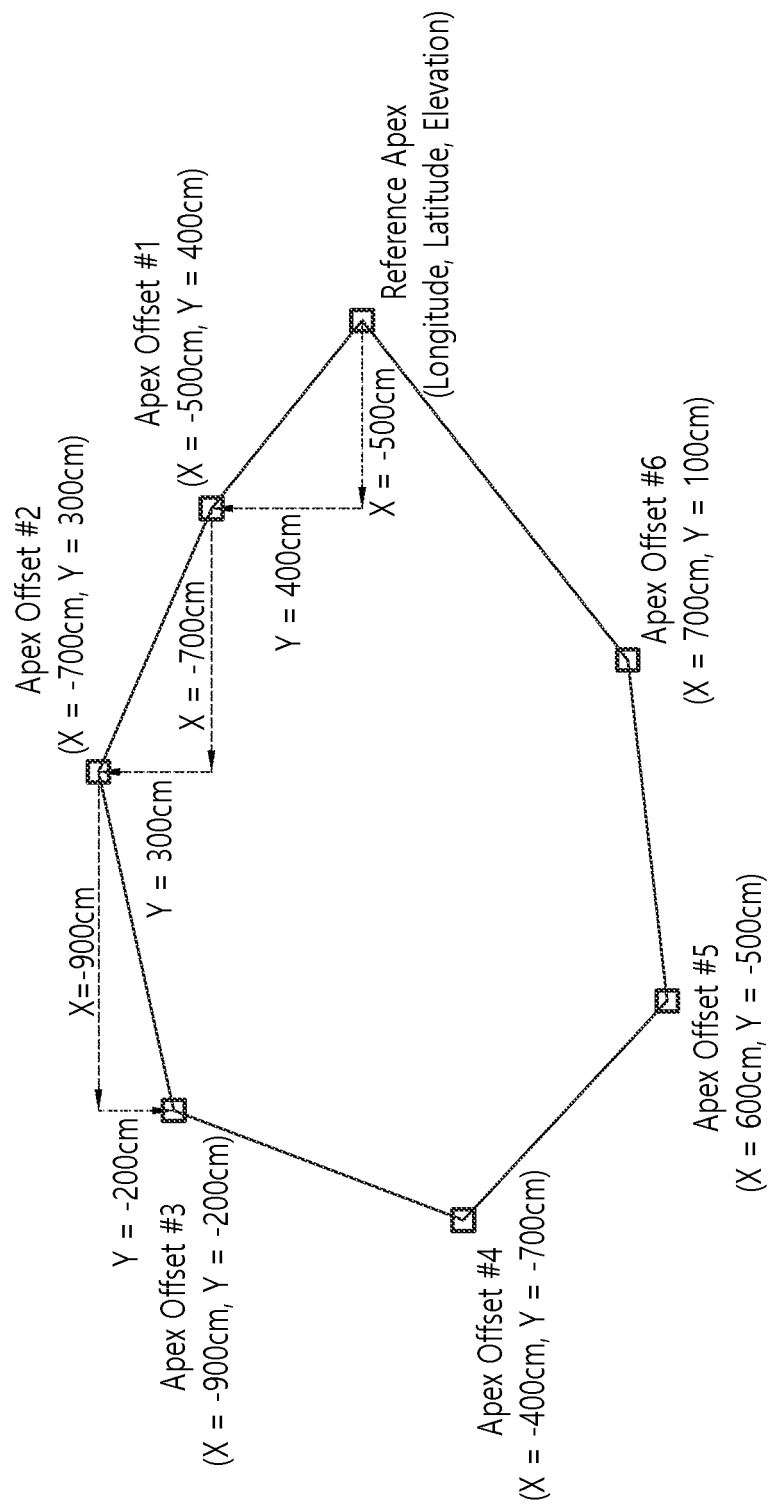
FIG. 9 shows an example of representing a device area.

FIG. 9 shows an example of representing a device area.

The V2X server defines one of the plurality of apexes for the device area as a reference apex. The reference apex may be expressed in a latitude, a longitude and a height. The remaining apexes are expressed as offsets based on the position of the reference apex. The number of apexes and offset values are merely examples.

Figure 10:
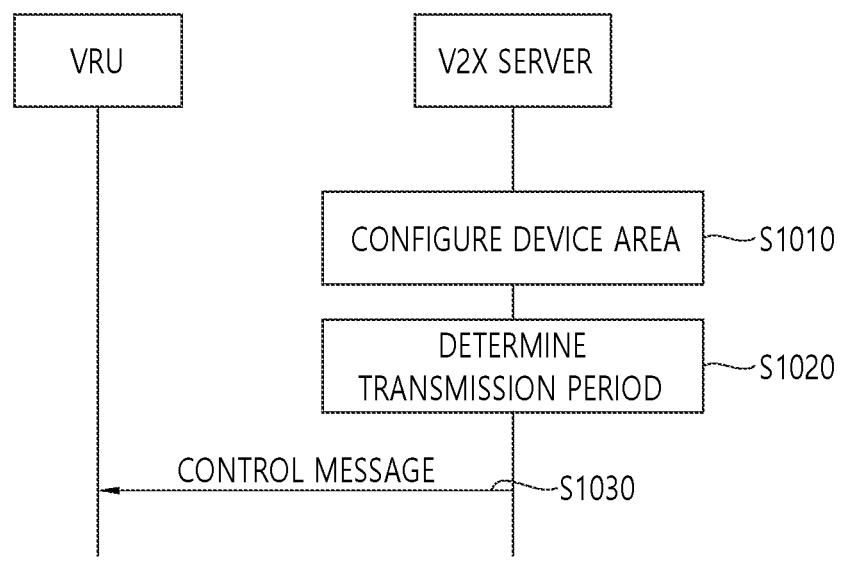
FIG. 10 illustrates a method for controlling a transmission period according to an embodiment of the present specification.

FIG. 10 illustrates a method for controlling a transmission period according to an embodiment of the present specification.

In step S1010, a V2X server configures a device area. The device area may be configured based on any one of the embodiments shown in FIGS. 5 to 8. The V2X server may configure the device area based on the risk of VRUs.

In step S1020, the V2X server determines the transmission period of each VRU in the device area.

In step S1030, the V2X server sends a control message including the determined transmission period to each VRU.

Figure 11:
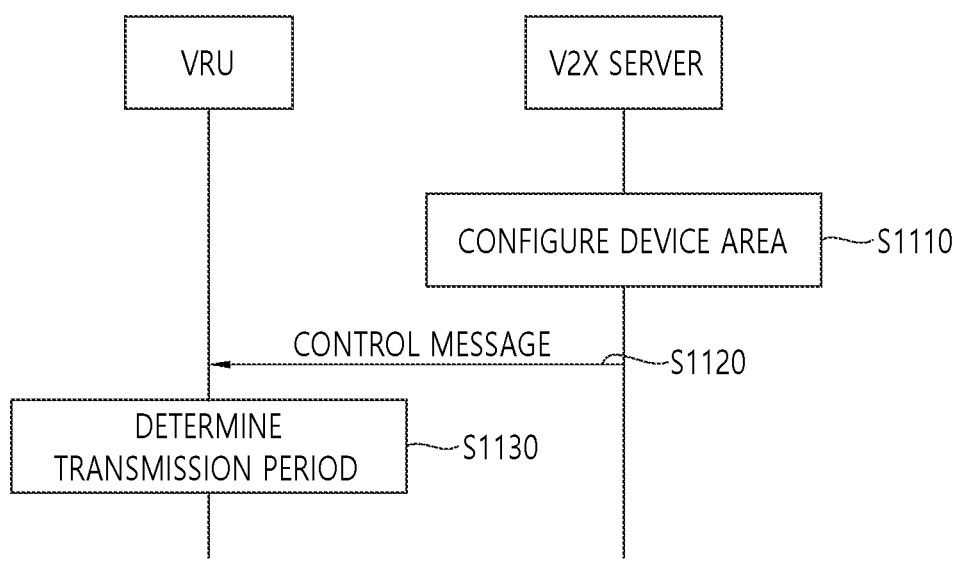
FIG. 11 illustrates a method for controlling a transmission period according to another embodiment of the present specification.

FIG. 11 illustrates a method for controlling a transmission period according to another embodiment of the present specification.

In step S1110, the V2X server configures a device area. The device area may be configured based on any one of the embodiments shown in FIGS. 5 to 8. The V2X server may configure the device area based on the risk of VRUs.

In step S1120, the V2X server sends a control message including control information related to the device area to the VRU. The control information may include at least any one of the evaluated risk of the VRU, the device area, the location (or offset) of the VRU within the device area, the VRU group (or level) to which the VRU belongs, and the transmission period proposed by the V2X server.

In step S1130, the VRU determines a transmission period based on the control information. The VRU may transmit a message having information on the determined transmission period to the V2X server.

The VRU may modify the reception period for receiving the message from the V2X server based on the control information. The VRU may transmit a message having information about the modified reception period to the V2X server.

Figure 12:
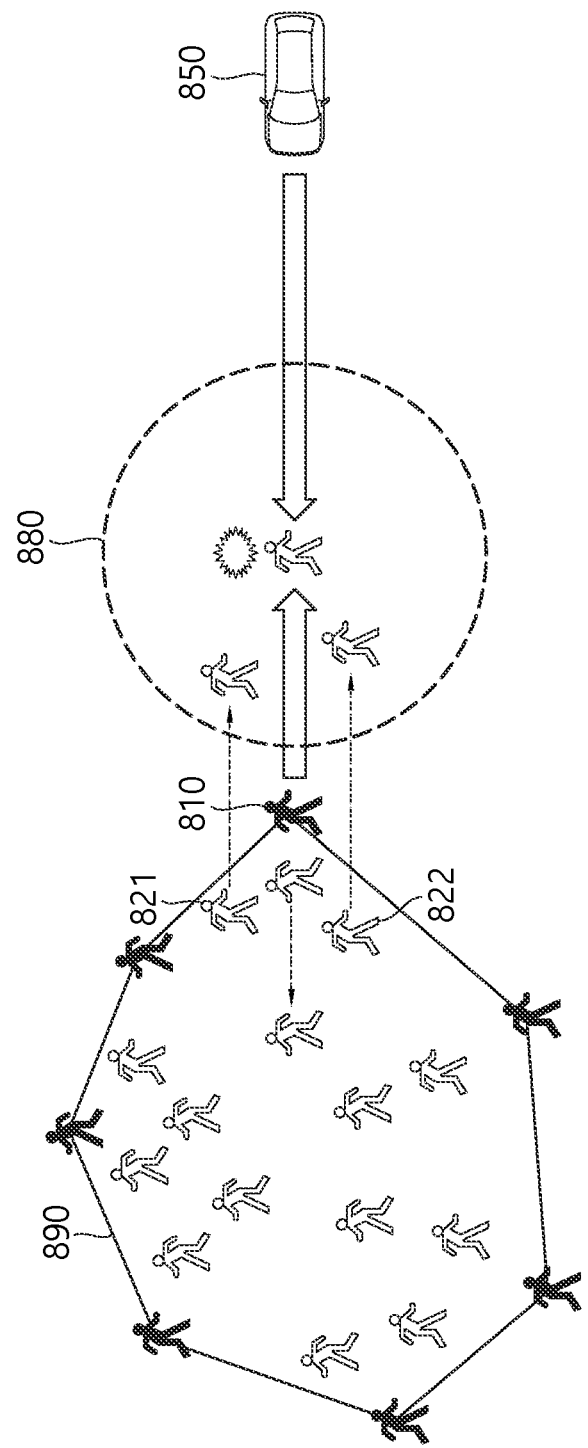
FIG. 12 shows an example in which a V2X server and VRUs operate based on a device area.

FIG. 12 shows an example in which a V2X server and VRUs operate based on a device area.

The V2X server configures a device area 890, and also configures an exterior VRU 810 and interior VRUs 821 and 822.

The exterior VRU 810 of the device area 890 checks its own risk level. The exterior VRU 810 may receive the V2X message of the surrounding vehicle 850 directly or through a V2X server. Based on the V2X message, the VRU 810 may acquire driving information of the surrounding vehicle 850. Assume that the exterior VRU 810 confirms that a collision between the external VRU 810 and the surrounding vehicle 850 is expected after a time T based on the driving information.

The exterior VRU 810 transmits collision risk information to the V2X server. The V2X server calculates an expected risk area 880 based on the collision risk information. The predicted risk area 880 may include an area in which a risk due to a collision may occur after time T. The V2X server may determine the expected risk area 880 in consideration of the delay time for transmitting the collision risk information, the delay time for transmitting the V2X message of the vehicle, and the data processing time.

The V2X server determines the interior VRUs 821 and 822 to be located within the expected risk area 880 after time T. This is called a warning VRU. The warning VRUs 821 and 822 may be calculated in consideration of the movement pattern (direction, speed, etc.) of the corresponding VRU. The V2X server sends a warning message to the warning VRUs 821 and 822. The warning message may include information about the expected risk information, the immediate transmission request of the V2X message, and the updated transmission period. The updated transmission period may be shorter than the previous transmission period. In addition, The V2X server can adjust so that a transmission period of the V2X message of the vehicle 850 is shorter than the forwarding period of the warning VRUs 821 and 822. For example, the period may be adjusted from 5 seconds to 100 ms.

The warning VRUs 821 and 822 may warn the user based on the warning message received from the V2X server, and change the transmission period. And, the warning VRUs 821 and 822 may operate in the same way as the exterior VRUs.

When the risk is cleared, the V2X server can return to its normal state. The V2X server analyzes the cluster shape of VRUs to classify exterior VRUs from interior VRUs, and sets the device area. The V2X server controls the transmission periods by transmitting control messages to the exterior VRU and the interior VRU.

Figure 13:
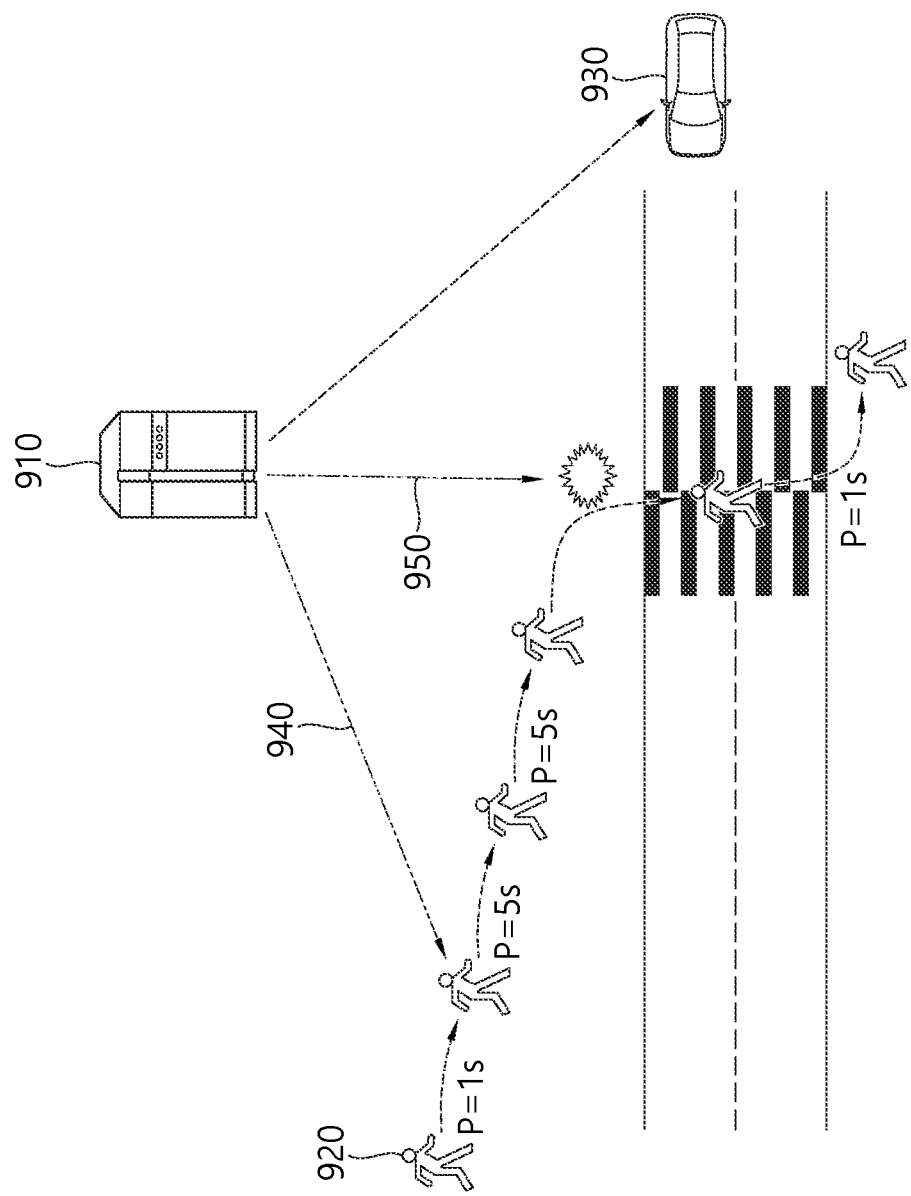
FIG. 13 shows an example in which a V2X server transmits a V2X message through path prediction.

FIG. 13 shows an example in which a V2X server transmits a V2X message through path prediction.

A V2X server may generate and transmit a V2X message for a VRU according to specific conditions. The V2X server calculates the predicted path of the VRU and compares it with the actual path of the VRU. If the difference between the predicted path and the actual path is less than or equal to a certain level, the V2X server may generate and transmit a V2X message for the VRU on behalf of the VRU.

For example, assumed that the initial transmission period P of the VRU 920 is 1 second. The V2X server 910 calculates the predicted path of the VRU 920 and compares it with the actual path. If the difference between the predicted path and the actual path is less than a certain level, the V2X server 910 adjusts the transmission period of the VRU 920 through the control message 940. Let the adjusted transmission period be 5 seconds. If the predicted path matches the actual path, the V2X server 910 increases the transmission period. By reducing the number of times for the VRU 920 to transmit a V2X message, it is possible to reduce battery consumption due to message transmission.

Although the VRU 920 sends a V2X message to the V2X server 910 at intervals of 5 seconds, the V2X server 910 may send a V2X message of the VRU 920 to the surrounding vehicle 930 at intervals of 1 second. This is because, since the predicted path of the VRU 920 is known in advance, the V2X server 910 can generate a V2X message of the VRU 920.

If the path of the VRU 920 changes rapidly or the actual path does not match the predicted path, the V2X server 910 may transmit a control message 950 to the VRU 920 to modify the transmission period of the V2X message. For example, the transmission period may be changed from 5 seconds to 1 second. By changing to a shorter transmission period, the V2X server 910 may track the path of the VRU 920.

Figure 14:
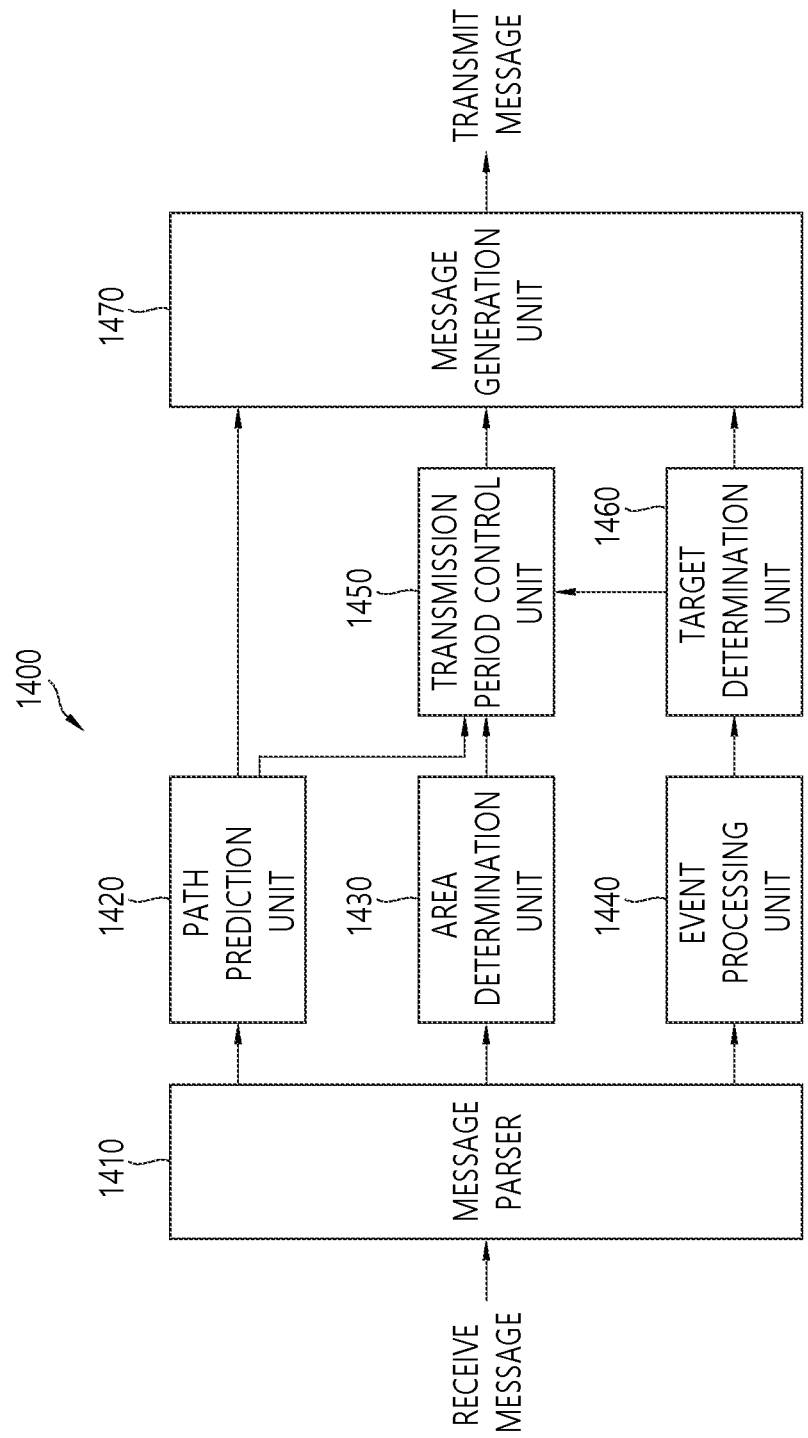
FIG. 14 shows a functional module of a V2X server for implementing an embodiment according to the present specification.

FIG. 14 shows a functional module of a V2X server for implementing an embodiment according to the present specification. Each module may be implemented in software, stored in a memory, and executed by a processor.

A V2X server 1400 may include a message parser 1410, a path prediction unit 1420, an area determination unit 1430, an event processing unit 1440, a transmission period control unit 1450, a target determination unit 1460, and a message generation unit 1470.

The message parser 1410 analyzes a message received from the V2X device. The path prediction unit 1420 determines a predicted path based on the path history of the V2X device. It determines whether the predicted path matches the actual path. The area determination unit 1430 determines a device area and determines a device group. The event processing unit 1440 processes an event (such as a risk of collision) for the V2X device. The transmission period control unit 1450 determines the transmission period of the V2X device. The target determination unit 1460 determines a V2X device to which the received message is delivered, and determines a V2X device that requires control as a result of the event processing. The message generation unit 1470 generates a V2X message and/or a control message to be transmitted to a V2X device.

Table 2 shows an example of a message format for a control message according to an embodiment of the present invention. Names, units, and values are merely examples, and not all elements are essential.

A V2X server 1510 may collect the surrounding environment in various ways (V2X messages, sensors, ITS servers, etc.). Based on the collected surrounding environment, the V2X server 1510 may control the transmission period of the V2X device.

Assume that there are multiple VRUs 1580 in a crosswalk. A plurality of VRUs 1580 do not support the V2X function, but the V2X server 1510 may recognize it through surrounding CCTVs. The V2X server 1510 may further reduce the transmission period of the V2X device 1520 approaching a plurality of VRUs 1580 to prepare for a risk.

The V2X server 1510 may receive an event (poor visibility, icy road, rockfall, forward accident, etc.) from the infrastructure. For example, certain sections of the road can be dangerous due to fog. The V2X server 1510 may further reduce the transmission period of the V2X device 1530 entering the specific section to prepare for a risk.

The V2X server 1510 may control the transmission period according to the location of the V2X device. When the V2X devices 1520 are in a safe zone (parks, vehicle traffic restricted areas, etc.), the V2X server 1510 may increase the

TABLE 2

```
DeviceControlMessage ::= SEQUENCE {
TimeStamp          // time at which the message was generated, Unit (Minute)
Second             // time at which the message was generated, Unit (Millisecond)
ValidDuration      // Valid duration of message, Unit (Millisecond)
SequenceNumber     // Sequence number of message
Id                 // ID of message geneating device
ControlDesciption  // Area control parameters, see table 3
EventDescription   // Event information, see table 4
}
```

TABLE 3

```
ControlDesciption ::= SEQUENCE {
ThreatNotification   // Threat alert notification, Integer(0:allow, 1 :not allow)
AreaDescription      // Area information
}
AreaDescription ::= SEQUENCE {
AreaLevel      // level of area, Integer (0..10)
AreaList       // List describing area, See DF_AreaList
}
AreaList ::= SEQUENCE {
RefPoint       // Starting point of area
ApexSetXY      // Apex representing area, List of XY offsets against RefPoints
MsgTxInterval  // transmission period, Integer (0..65535), Unit (Millisecond)
}
```

TABLE 4

```
EventDesciption ::= SEQUENCE {
EventType             // Type of event
TimeStamp             // Event occurrence time, Unit (Minute)
Second                // Event occurrence time, Unit (Millisecond)
RefPoint              // Event location
Id                    // ID of event target
EventTypeDescription  // Description of event
}
EventType ::= ENUMERATED {
Unknown          // Unknown area
Construction     // Under construction
Accident         // Accident
EmergencyAlert   // Approaching emergency vehicles
Fog              // Fog
Flooding         // Flooding
}
```

Figure 15:
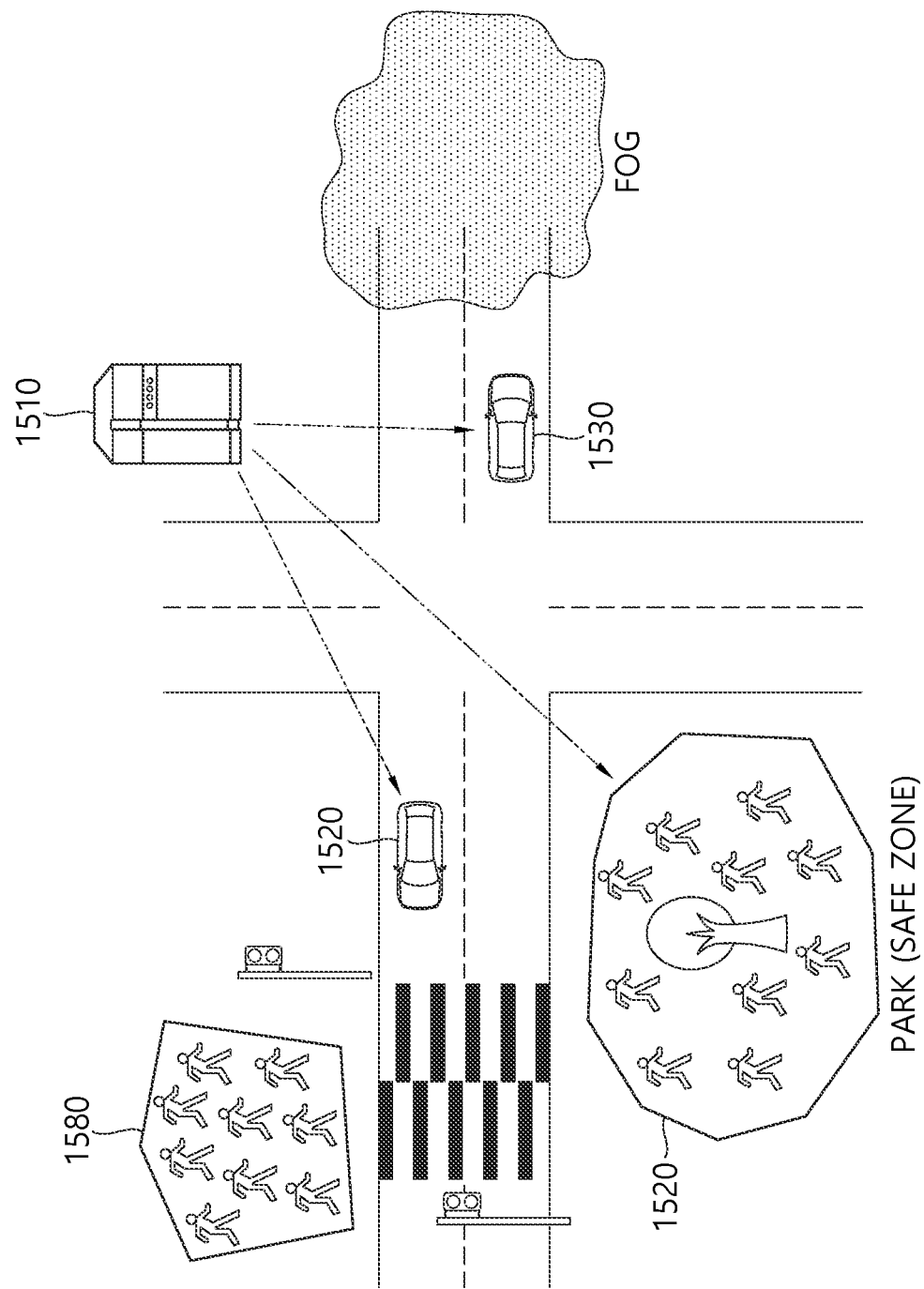
FIG. 15 shows another example of controlling the transmission period.

FIG. 15 shows another example of controlling the transmission period.

transmission period of the V2X devices 1520. When the V2X devices 1520 goes out of the safe zone, the transmission period can be restored.

According to the above-described embodiment, by reducing the transmission period of the message transmitted by the V2X device or the V2X server as needed, it is possible to reduce the amount of radio resources used for message transmission. Power consumption of each device can also be reduced.

In the above examples, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A server for vehicle-to-everything (V2X) service, the server comprising:
a processor; and
a memory operatively coupled with the processor and configured to store instructions that, when executed by the processor, cause the server to perform functions comprising:
configuring a device area comprising a plurality of V2X devices, wherein each V2X device periodically transmits a V2X message to the server according a transmission period, the V2X message comprising a V2X ID identifying a corresponding V2X device and driving information of the corresponding V2X device; and
classifying the plurality of V2X devices within the device area into a plurality of device groups,
wherein the plurality of device groups have different transmission periods.

2. The server of claim 1, wherein the device area is classified so that a first device group including one or more V2X devices with the highest risk is placed at the border of the device area.

3. The server of claim 2, wherein the device area is classified so that a second device group including one or more V2X devices having a lower risk than the first device group is disposed inside the device area.

4. The server of claim 3, wherein the first device group has a shorter transmission period than the second device group.

5. The server of claim 1, wherein the functions further comprise:
transmitting a control message for controlling the transmission period to each V2X device in the plurality of device groups.

6. The server of claim 5, wherein the control message includes at least one of an evaluated risk of a corresponding V2X device, the device area, a location of the corresponding V2X device in the device area, a device group to which the corresponding V2X device belongs, and the transmission period.

7. A method for vehicle-to-everything (V2X) service, the method performed by a server and comprising:
configuring a device area comprising a plurality of V2X devices, wherein each V2X device periodically transmits a V2X message to the server according a transmission period, the V2X message comprising a V2X ID identifying a corresponding V2X device and driving information of the corresponding V2X device; and
classifying the plurality of V2X devices within the device area into a plurality of device groups,
wherein the plurality of device groups have different transmission periods.

8. The method of claim 7, wherein the device area is classified so that a first device group including one or more V2X devices with the highest risk is placed at the border of the device area.

9. The method of claim 8, wherein the device area is classified so that a second device group including one or more V2X devices having a lower risk than the first device group is disposed inside the device area.

10. The method of claim 9, wherein the first device group has a shorter transmission period than the second device group.

11. A device for vehicle-to-everything (V2X) service, the device comprising:
a processor; and
a memory operatively coupled with the processor and configured to store instructions that, when executed by the processor, cause the server to perform functions comprising:
transmitting periodically a V2X message to a V2X server according a transmission period, the V2X message comprising a V2X ID identifying the device and driving information of the device;
receiving a control message for modifying the transmission period from the V2X server device; and
determining whether the transmission period is modified based on the control message.

12. The device of claim 11, wherein the control message includes at least one of an evaluated risk of the device, a device group to which the device belongs, and a transmission period proposed by the V2X server.

13. The device of claim 11, wherein the functions further comprise:
when the transmission period is modified, transmitting a message including information on the modified transmission period to the V2X server.

* * * * *